(12) United States Patent
Vathylakis et al.

(10) Patent No.: US 10,900,465 B2
(45) Date of Patent: Jan. 26, 2021

(54) NOISE REDUCTION TO THE TRAILING EDGE OF FLUID DYNAMIC BODIES

(71) Applicant: Brunel University, Uxbridge Middlesex (GB)

(72) Inventors: Alexandras Vathylakis, Uxbridge Middlesex (GB); Tze Pei Chong, Uxbridge Middlesex (GB)

(73) Assignee: Brunel University London, Uxbridge Middlesex (GB)

( * ) Notice: Subject to any disclaimer, the term of this patent is extended or adjusted under 35 U.S.C. 154(b) by 467 days.

(21) Appl. No.: 15/382,196

(22) Filed: Dec. 16, 2016

(65) Prior Publication Data

US 2017/0298740 A1 Oct. 19, 2017

Related U.S. Application Data

(63) Continuation of application No. PCT/GB2015/051760, filed on Jun. 16, 2015.

(30) Foreign Application Priority Data

Jun. 16, 2014 (GB) ..................................... 1410675

(51) Int. Cl.
*F03D 1/06* (2006.01)
*F01D 5/14* (2006.01)
*F01D 5/28* (2006.01)

(52) U.S. Cl.
CPC .......... *F03D 1/0675* (2013.01); *F01D 5/141* (2013.01); *F01D 5/28* (2013.01); *F03D 1/0633* (2013.01);

(Continued)

(58) Field of Classification Search
CPC ........ F01D 5/28; F01D 5/183; F05B 2250/18; F05B 2250/182; F05B 2250/183;
(Continued)

(56) References Cited

U.S. PATENT DOCUMENTS

| 6,733,240 B2 | 5/2004 | Gliebe |
| 7,780,420 B1 * | 8/2010 | Matheny .................. F01D 5/14 416/241 R |

(Continued)

FOREIGN PATENT DOCUMENTS

| CN | 102635573 A | 8/2012 |
| EP | 1338793 A3 | 8/2003 |

(Continued)

OTHER PUBLICATIONS

International Search Report and Written Opinion dated Dec. 23, 2015 in connection with International Application PCT/GB2015/051760.

*Primary Examiner* — Kenneth J Hansen
(74) *Attorney, Agent, or Firm* — Cook Alex Ltd.; Ryan M. Truesdale (57) ABSTRACT

A fluid dynamic body having a trailing edge with a pattern formed thereon, the pattern can include a plurality of smoothly surfaced adjacent members with respective interstices therebetween, wherein at least one of the interstices completely contains a porous barrier. In some embodiments, the porous barrier can obstruct fluid flow through the respective interstice between a first surface of the fluid dynamic body on a first side of the trailing edge and a second surface of the fluid dynamic body on a second side of the trailing edge. This helps to reduce noise produced at the trailing edge. In some embodiments, the fluid dynamic body is a wind turbine blade or an air-engine blade.

18 Claims, 11 Drawing Sheets

(52) U.S. Cl.
CPC ....... *F05B 2230/50* (2013.01); *F05B 2240/30* (2013.01); *F05B 2250/182* (2013.01); *F05B 2260/96* (2013.01); *F05B 2280/10* (2013.01); *F05B 2280/4003* (2013.01); *F05B 2280/4011* (2013.01); *F05B 2280/6012* (2013.01); *F05B 2280/6015* (2013.01)

(58) Field of Classification Search
CPC ............ F05B 2250/191; F05B 2280/10; F05B 2260/962; F05B 2240/122; F05B 2260/96; F05B 2280/6012; F05B 2280/4003; F05B 2280/4011; F05B 2280/6015; F03D 1/0608; F03D 1/065; F03D 1/0633; F03D 1/0675; B64C 2230/14
See application file for complete search history.

(56) References Cited

U.S. PATENT DOCUMENTS

| | | | |
|---|---|---|---|
| 7,918,653 | B2 | 4/2011 | Standish et al. |
| 8,414,261 | B2 | 4/2013 | Bonnet |
| 8,695,915 | B1 | 4/2014 | Jones et al. |
| 2003/0031331 | A1* | 2/2003 | Harris .................... H04R 7/045 381/152 |
| 2008/0298967 | A1 | 12/2008 | Gil et al. |
| 2009/0074585 | A1 | 3/2009 | Koegler et al. |
| 2010/0143151 | A1* | 6/2010 | Kinzie .................. F03D 1/0675 416/248 |
| 2011/0142665 | A1 | 6/2011 | Huck |
| 2011/0223030 | A1* | 9/2011 | Huck .................... F03D 1/0675 416/228 |
| 2013/0149162 | A1 | 6/2013 | Smith et al. |
| 2013/0223988 | A1 | 8/2013 | Kristensen et al. |

FOREIGN PATENT DOCUMENTS

| | | |
|---|---|---|
| EP | 1314885 B1 | 8/2007 |
| EP | 2216545 A2 | 8/2010 |
| EP | 2806156 A1 | 8/2016 |
| GB | 2497739 A | 6/2013 |
| WO | 2012/071679 A1 | 6/2012 |
| WO | 2013/076009 A1 | 5/2013 |
| WO | 2014/044412 A1 | 3/2014 |
| WO | 2014/048581 A1 | 4/2014 |

\* cited by examiner

NOISE REDUCTION TO THE TRAILING EDGE OF FLUID DYNAMIC BODIES

CROSS-REFERENCE TO RELATED APPLICATIONS

This application is a continuation of International Application PCT/GB2015/051760 having a filing date of Jun. 16, 2015, entitled "Noise Reduction to the Trailing Edge of Fluid Dynamic Bodies", which is related to and claims priority benefits from UK patent application No. 1410675.1 filed on Jun. 16, 2014. This application also claims foreign priority benefits from the 1410675.1 application. The '760 and '675.1 applications are hereby incorporated by reference herein in their entireties.

FIELD OF THE INVENTION

The present invention concerns fluid dynamic bodies with a trailing edge, such as control elements like ailerons, rudders, etc. and lift elements like wings and canards of airplanes, as well as fan and rotor blades such as those suitable for use in wind turbines and air-engines. The present invention is not restricted to aerodynamic bodies with a trailing edge. It is equally applicable to other uses, such as but not limited to, hydrodynamic bodies with a trailing edge, such as the control elements of waterborne vessels.

BACKGROUND OF THE INVENTION

The trailing edge of a fluid dynamic body produces noise by processes such as vortex shedding and boundary layer separation into the fluid medium through which the body moves. Several steps to mitigate such noise production include, among other methods, providing the trailing edge with a serration.

Examples of providing a wind turbine blade with a serrated trailing edge can be found in EP1314885 B1 (Siemens Aktiengesellschaft), WO2012/071679 A1 (General Electric Company), WO2014/044412 A1 (Siemens Aktiengesellschaft), EP1338793 A3 (Mitsubishi Heavy Industries, Ltd.), US2009/0074585 A1 (Koegler) and US2013/0223988 A1 (Kristensen).

Examples of providing a rotor blade for an aircraft engine with a serrated trailing edge are discussed in GB2497739 (Rolls Royce PLC) and U.S. Pat. No. 6,733,240 B2 (Gliebe). Examples of providing the blades of smaller domestic or light industrial fans with a serrated trailing edge, are disclosed, for example, in CN102635573 A (Zhejiang Sci-Tech University).

Patterns with other, more elaborate shapes than serrations for the trailing edge of a fluid dynamic body have also been proposed to help in noise reduction. Some of these patterns are repeating or periodic and some are non-repeating or aperiodic. U.S. Pat. No. 8,414,261 B2 (Bonnet) describes interdigitating two different patterns of teeth of different dimensions from each other for noise reduction in a wind turbine blade. U.S. Pat. No. 7,918,653 B2 (Standish) describes providing the trailing edge of a fluid dynamic body with teeth each in the shape of a square-based pyramid or with a row of bristles to help reduce noise. U.S. Pat. No. 7,918,653 B2 contemplates mounting bristles either on the apices of the square-based pyramidal teeth or in interstices between them. US2008/0298967 (Gil) describes providing the trailing edge of a wind turbine blade with a row of teeth in the shape of arrowheads.

In an effort to reduce trailing edge noise further, US2013/0149162 A1 (Smith) describes providing the trailing edge with aperiodic or randomly varied serrations, thereby creating vortices of varying size, energy and distance from the trailing edge, which tend to cancel each other out, while avoiding the creation of adjacent, mutually reinforcing vortices.

U.S. Pat. No. 8,695,915 B1 (Jones) describes providing the side edges of aircraft control elements with perforations to reduce noise. In this case, however, the trailing edges of the control elements are not perforated and instead remain sharply defined.

U.S. Pat. No. 7,780,420 B1 (Matheny) describes providing aircraft engine blades with a trailing edge made of foamed metal. The aim of U.S. Pat. No. 7,780,420 B1 however, is not to mitigate noise, but to keep the trailing edge sharply defined, while also making it lighter, stronger, stiffer and more resistant to degradation by impact from particles like sand. Therefore, any porosities present in the foamed metal are impregnated with resin during manufacture, to make the trailing edge non-porous after manufacture.

US 2011/0223030 A1 (General Electric Company) discloses a rotor blade assembly for a wind turbine. The trailing edge of the rotor blade has a series of serrations with a plurality of bristles extending therefrom as a noise reduction feature.

Other background art is disclosed in US2011/0142665 A1 (General Electric Company); EP2216545 A2 (General Electric Company); EP2806156 A1 (Siemens); and WO2013/076009 A1 (LM Wind Power).

SUMMARY OF THE INVENTION

An improved fluid dynamic body having a trailing edge with improved noise reduction properties is disclosed.

In some embodiments, a fluid dynamic body has a trailing edge with a pattern formed thereon, the pattern comprising a plurality of smoothly surfaced adjacent members with respective interstices therebetween, wherein at least one of the interstices completely contains a porous barrier. In at least some embodiments, the porous barrier obstructs fluid flow through the respective interstice between a first surface of the fluid dynamic body on a first side of the trailing edge and a second surface of the fluid dynamic body on a second side of the trailing edge.

In at least some embodiments, the plurality of adjacent members of the pattern should be smoothly surfaced, since surface roughness adds to noise generation by inhibiting laminar flow over the fluid dynamic body. "Smoothly surfaced" means that the adjacent members are smoothly surfaced on a macroscopic scale. For example, whether the adjacent members have a polished or unpolished finish is not relevant to whether they are smoothly surfaced on a macroscopic scale, even if an unpolished finish could be considered as not being smoothly surfaced on a microscopic scale. In some embodiments, the respective interstice should also completely contain the porous barrier for the same reason, since if the porous barrier extends beyond the interstice or for example if it overlays the interstice, this can inhibit laminar flow over the fluid dynamic body and add to noise generation. "Completely contains" does not necessarily mean that the interstice is completely full of the porous barrier (although in some embodiments it can be); rather that the porous barrier is completely contained within the interstice. In some embodiments, the porous barrier is not completely contained within the interstice.

A "porous barrier" is a barrier that has pores: minute openings through which fluids or gases can pass. The bristles disclosed in US 2011/0223030 A1 (Huck) are not a porous barrier because the bristles do not form a plurality of minute openings through which fluids or gases can pass.

In some preferred embodiments, the porous barrier should have a solidity ratio of at least about 4% and at most about 96%. "Solidity ratio" refers to the ratio of solid material to porosities in the barrier. In at least some embodiments, a solidity ratio of less than about 4% is not sufficient to obstruct fluid flow through the respective interstice between a first surface of the fluid dynamic body on a first side of the trailing edge and a second surface of the fluid dynamic body on a second side of the trailing edge. On the other hand, a solidity ratio of more than about 96% tends to fill the respective interstice such that the pattern on the trailing edge also becomes filled in and the noise reducing benefits of such a pattern can be lost.

In some embodiments, it is also preferable that the porous barrier should provide a convoluted, chaotic or irregular pathway for fluid flow through the respective interstice between the first surface of the fluid dynamic body on the first side of the trailing edge and the second surface of the fluid dynamic body on the second side of the trailing edge, since this is found to be most efficient in obstructing fluid flow through the respective interstice in these directions. If the porous barrier provides a plurality of such convoluted, chaotic or irregular pathways, these can, in some preferred embodiments, also be chaotically or irregularly arranged, in order to prevent, or at least reduce, resonance or sympathetic amplification of fluid flow between different pathways.

In some preferred embodiments, the porous barrier should fully occupy a width of the respective interstice. By the "width" of the interstice is meant a dimension of the interstice substantially parallel to the trailing edge. This is because a porous barrier which occupies the full width of the interstice is most effective in obstructing fluid flow between the first surface of the fluid dynamic body on a first side of the trailing edge and the second surface of the fluid dynamic body on a second side of the trailing edge.

In some more preferred embodiments, the porous barrier should occupy most, if not the entire, of the volume of the respective interstice.

The pattern formed on the trailing edge can be periodic, like a serration, or aperiodic, as in US2013/0149162 A1 (Smith). In either case, however, the pattern on the trailing edge comprises a plurality of adjacent members with respective interstices therebetween. The plurality of adjacent members can be teeth or serrations, for example. These have the noise reduction properties. However, by further providing a porous barrier in an interstice between adjacent members, fluid flow through the interstice between a first surface of the fluid dynamic body on a first side of the trailing edge and a second surface of the fluid dynamic body on a second side of the trailing edge is obstructed. For example, the first surface on the first side of the trailing edge can be a suction or upper surface of an airfoil and the second surface on the second side of the trailing edge can be a pressure or lower surface of the airfoil. Providing a barrier in the interstice between adjacent members reduces noise by inhibiting the formation of vortices in the interstice, which would otherwise be shed from a location in the interstice between respective roots of the plurality of adjacent members. In other words, the locations between the roots of the adjacent members of the pattern, which are where the adjacent members are attached to the fluid dynamic body, would otherwise provide locations at which vortices could be formed by fluid flowing between the surfaces of the fluid dynamic body on opposite sides of the trailing edge. Provision of the barrier inhibits this fluid flow. On the other hand, since the barrier is also porous, it still allows fluid to flow in a major direction over the opposing surfaces of the fluid dynamic body and off the trailing edge thereof through the interstices between the adjacent members of the pattern, thereby not inhibiting the beneficial noise reducing effects provided by the pattern in the first place.

The plurality of adjacent members of the pattern can be either sharp or blunt. If the pattern is periodic like a serration, it can be a sharp serration like a sawtooth, wherein the plurality of adjacent members are pointed like triangles. In other embodiments, it can be a blunt serration like a rectangular or square wave, wherein the plurality of adjacent members are not pointed, but can terminate in a respective end face or be rounded. The plurality of adjacent members can abut each other at their respective roots, so that the interstices therebetween each commence in a line where the root of one such member abuts another. In other embodiments, the plurality of adjacent members can be spaced apart from each other, so that the interstices therebetween each commence with a face facing the trailing edge of the fluid dynamic body, the face separating one such member from another. In either case, the porous barrier contained in the interstice are sufficient to obstruct the flow of fluid between the first surface on the first side of the trailing edge and the second surface on the second side of the trailing edge. In some preferred embodiments, therefore, the porous barrier occupies a complete width of the interstice.

In the embodiment shown in FIG. 11 of U.S. Pat. No. 7,918,653 B2, bristle 112 does not provide a barrier sufficient to obstruct the flow of fluid between first surface 30 on the first side of rotor blade 22 and second surface 32 on the second side thereof through interstice 116 formed between adjacent members 90 of pattern 28 formed on the trailing edge of rotor blade 22. Moreover, bristle 112 is not itself porous.

The porous barrier can comprise a foam with a network of pores therein. It can be made of foamed metal, in which case pores of the foamed metal should not be filled with resin or the like, so that the barrier remains porous. An example of a suitable foamed metal is that supplied by Recemat BV Cell Material Engineering of De Chamotte 20, 4191 GT Geldermalsen, The Netherlands. Such a foamed metal has a solidity ratio of only about 5%. In some embodiments, the porous barrier can comprise perforations. In some embodiments, the perforations are created in the barrier by a micro-drilling process. The porous barrier can also comprise a plurality of bristles, like a brush. The bristles can be made of a plastics material, such as nylon.

In some preferred embodiments, the pattern on the trailing edge is part of a contour of an airfoil or hydrofoil of the fluid dynamic body, in which case, the adjacent members of the pattern are continuous with the opposing surfaces of the fluid dynamic body. This encourages smooth (laminar) flow of fluid over the opposing surfaces and off the trailing edge of the fluid dynamic body, thereby helping to minimize noise. Alternatively or additionally, the porous barrier can also be part of the contour of an airfoil or hydrofoil of the fluid dynamic body, in which case, the barrier is then also continuous with the opposing surfaces of the fluid dynamic body. Once again, this encourages smooth (laminar) flow of fluid over the opposing surfaces and off the trailing edge of the fluid dynamic body, to the same effect.

In some preferred embodiments, the fluid dynamic body is a wind turbine blade or an air-engine blade.

In some preferred embodiments, the porous barrier has a flow resistivity of from $10^2$ Pa·s/m$^2$ to $10^5$ Pa·s/m$^2$. In addition to the need for a porous barrier, the overall level of noise reduction is also a function of the flow resistivity of the barrier. In general, "porosity" is not the same as "flow resistivity". For example, two different porous materials can have the same "porosity", but different "flow resistivity".

Specific materials that have been found to result in good noise reduction are open-cell foams such as Basotect® foam (available from BASF), ArmaFoam® Sound (available from Armacell UK Ltd), blue 45 PPI reticulated foam and grey needle felting foam.

Potential materials for the porous barrier can additionally include woollen felt, synthetic foam, synthetic felt, elastomer foam, porous glass granulate, melamine resin-foam, metal-foam, PUR-foam and PU-foam, as well as materials having a flow resistivity of 700, 1000, 1500, 3600, 4000, 4400, 8200, 9800, 16500, 23100, 40100, 112100, 130200, 164800, 316500, or 506400 Pa·s/m$^2$.

A method of manufacturing a fluid dynamic body, comprising the steps of: forming a pattern on a trailing edge of the fluid dynamic body, the pattern comprising a plurality of smoothly surfaced adjacent members with respective interstices therebetween; providing at least one of the interstices with a porous barrier completely contained therein, the porous barrier obstructing fluid flow through the respective interstice between a first surface of the fluid dynamic body on a first side of the trailing edge and a second surface of the fluid dynamic body on a second side of the trailing edge.

In some preferred embodiments, the porous barrier is formed integrally with a contour of an airfoil or hydrofoil of the fluid dynamic body. This has the advantage of increasing the smoothness of fluid flow over the fluid dynamic body. In some embodiments, it is preferred that the steps of forming the pattern on the trailing edge and providing at least one of the interstices with a porous barrier are performed simultaneously, and that the step of providing at least one of the interstices with a porous barrier comprises forming the porous barrier integrally with the plurality of smoothly surfaced adjacent members. This aids in efficiency of manufacture and gives the finished product greater structural integrity and strength. If the porous barrier comprises perforations, these can be formed by micro-drilling, for example with a laser.

DESCRIPTION OF THE PREFERRED EMBODIMENTS

Figure 1:
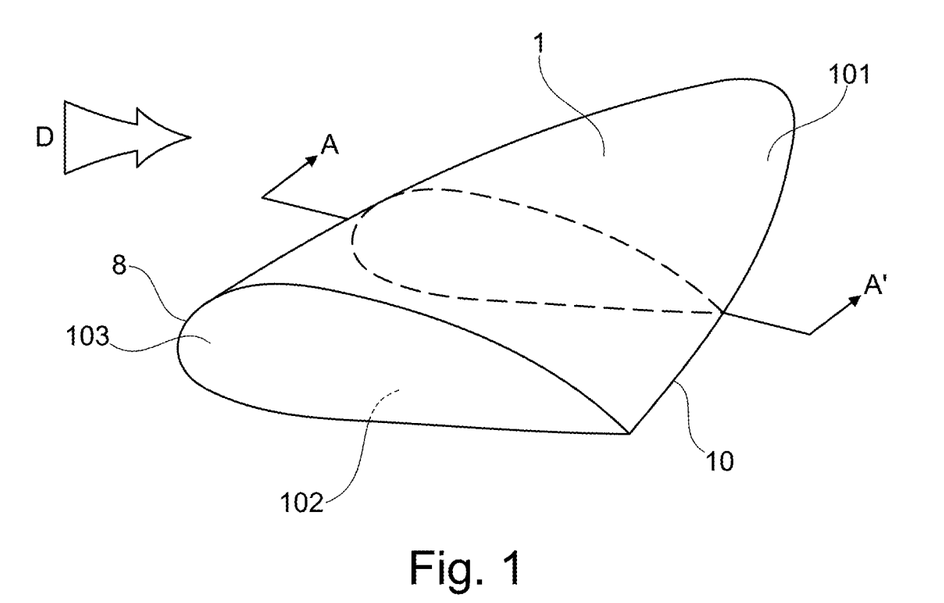
FIG. 1 shows a perspective view of a fluid dynamic body.
Figure 2:
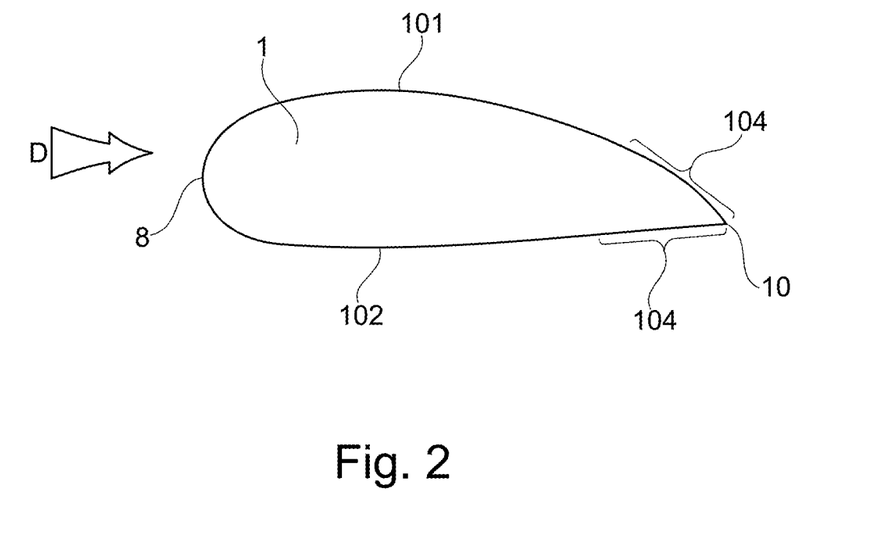
FIG. 2 shows a cross-sectional view through the fluid dynamic body of FIG. 1 in a plane containing the line A-A' shown in FIG. 1.

Referring firstly to FIG. 1, fluid dynamic body 1 has leading edge 8 and trailing edge 10. Fluid dynamic body 1 has first surface 101 on a first side of trailing edge 10 and second surface 102 on a second side of trailing edge 10, as well as side surface 103. Arrow D represents a major direction of fluid flow over the opposing surfaces 101, 102 of fluid dynamic body 1 and off trailing edge 10 thereof. The opposing surfaces 101, 102 of fluid dynamic body 1 can be more clearly seen in FIG. 2, which is a cross-sectional view through fluid dynamic body 1 of FIG. 1 in a plane containing the line labelled A-A' in FIG. 1. FIG. 2 also shows that in this instance, the opposing surfaces 101, 102 form part of contour 104 of an airfoil of fluid dynamic body 1.

Figure 3:
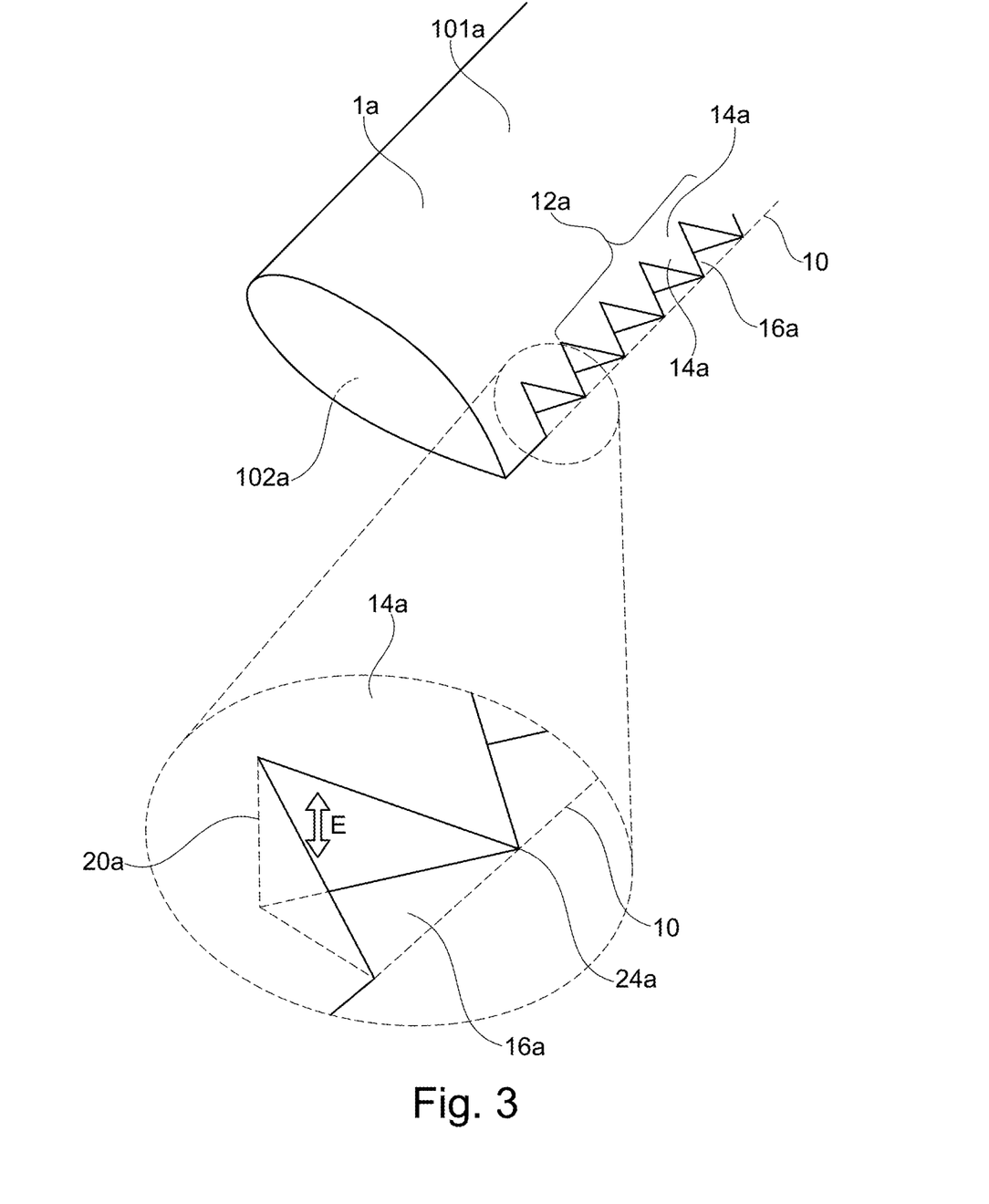
FIG. 3 shows a fluid dynamic body having a trailing edge with a first pattern formed thereon.

FIG. 3, shows fluid dynamic body 1a having trailing edge 10 with first pattern 12a formed thereon. Pattern 12a comprises a plurality of adjacent members 14a with respective interstices 16a therebetween. In this case, the plurality of adjacent members 14a are sharply pointed like triangles with respective apices 24a aligned on trailing edge 10. The plurality of adjacent members 14a also abut each other at their respective roots, so that the interstices 16a therebetween each commence in line 20a where the root of one such member 14a abuts another. Line 20a provides a location where vortices can be shed from fluid dynamic body 1a by fluid flowing parallel to line 20a between upper surface 101a and lower surface 102a of fluid dynamic body 1a in the directions indicated in FIG. 3 by the double-headed arrow labelled E, thereby generating noise.

Figure 4:
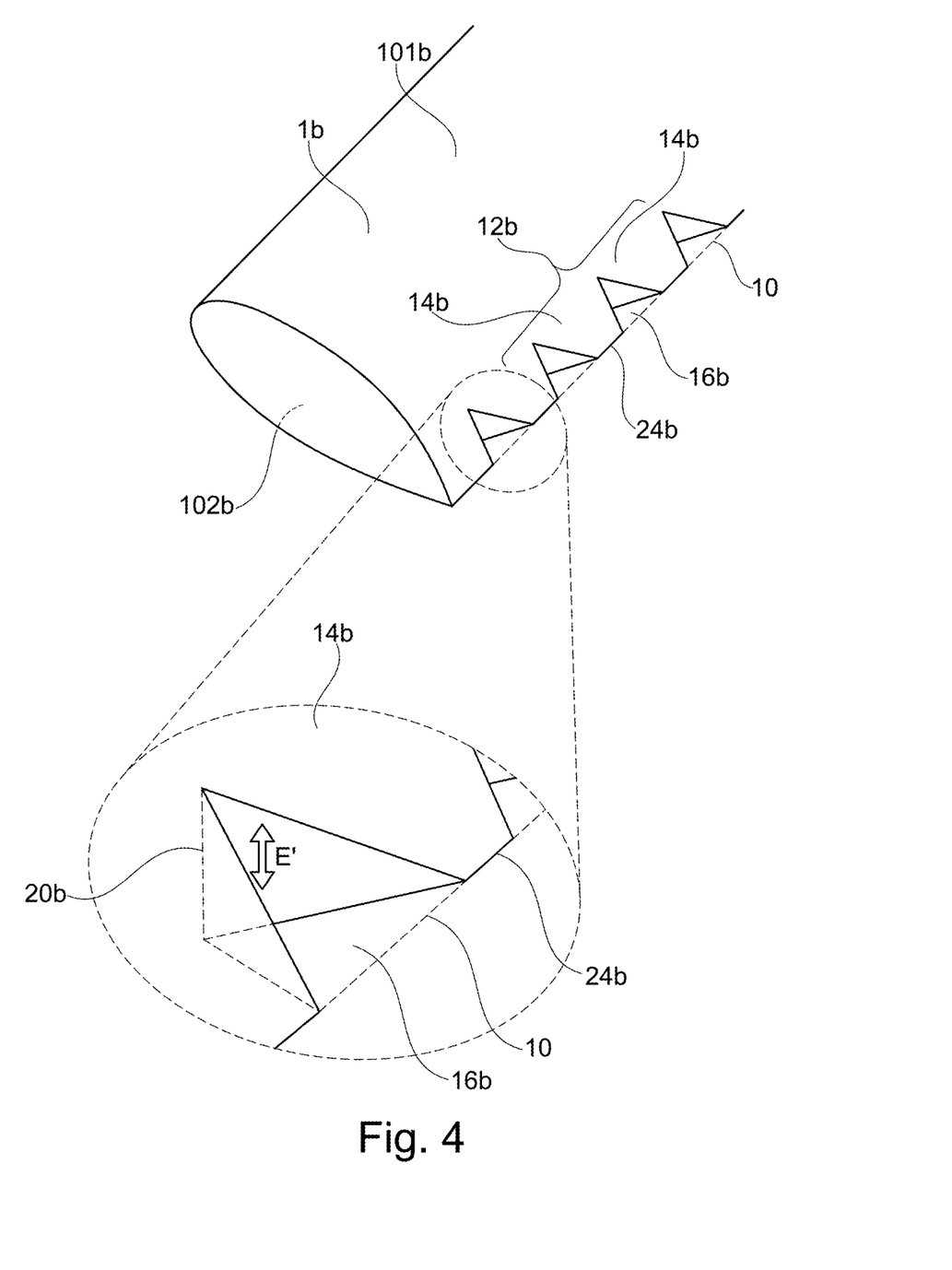
FIG. 4 shows a fluid dynamic body having a trailing edge with a second pattern formed thereon.

FIG. 4 shows fluid dynamic body 1b having trailing edge 10 with second pattern 12b formed thereon. Pattern 12b comprises a plurality of adjacent members 14b with respective interstices 16b therebetween. In this case, the plurality of adjacent members 14b are blunt and terminate in line 24b coincident with trailing edge 10 of fluid dynamic body 1b. On the other hand, the plurality of adjacent members 14b still abut each other at their respective roots, so that interstices 16b therebetween each commence in line 20b where the root of one such member 14b abuts another. As in FIG. 3, line 20b provides a location where vortices can be shed from the fluid dynamic body 1b by fluid flowing parallel to line 20b between upper surface 101b and lower surface 102b of fluid dynamic body 1b in the directions indicated in FIG. 4 by a double-headed arrow labelled E', thereby generating noise.

Figure 5:
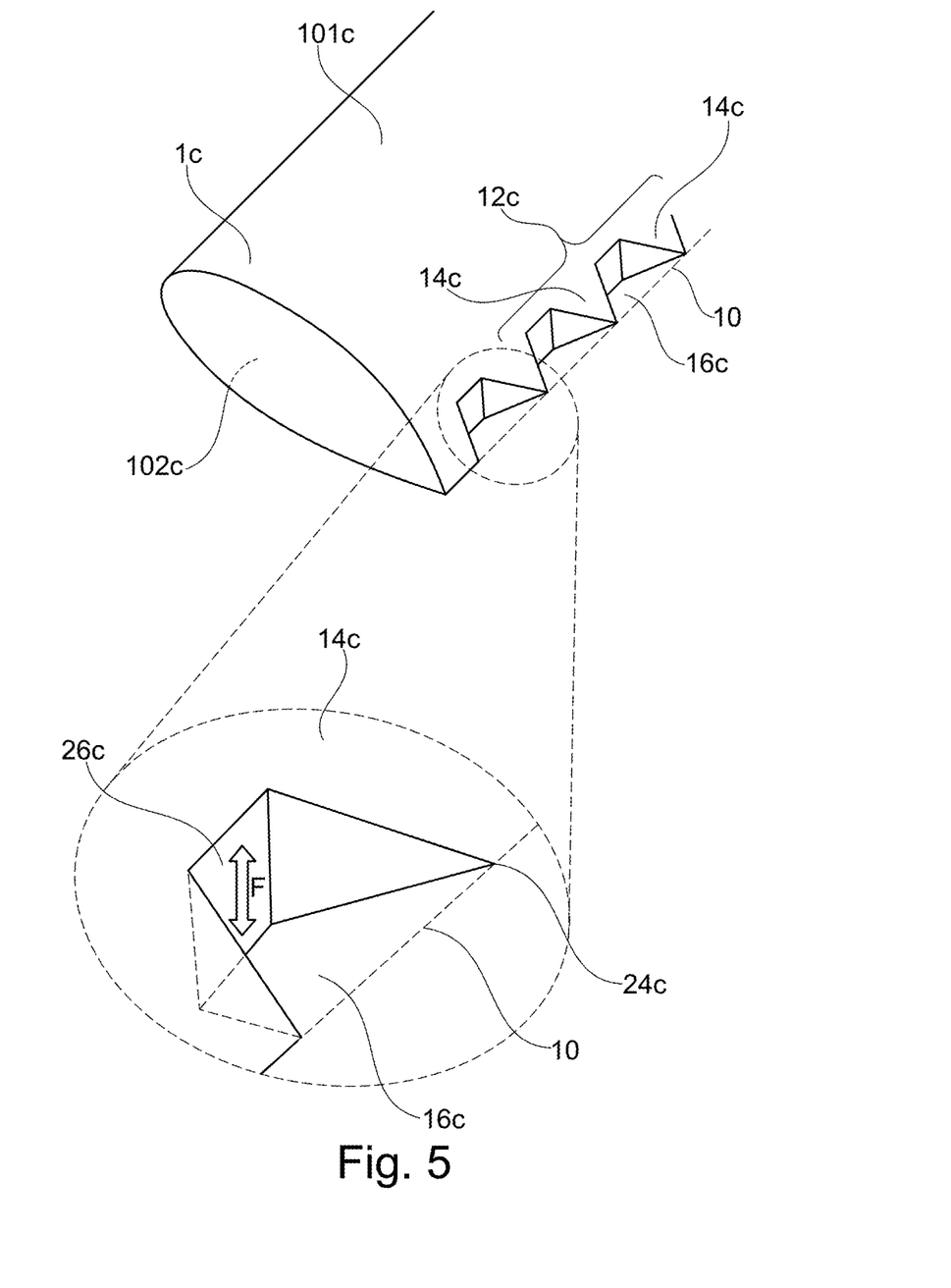
FIG. 5 shows a fluid dynamic body having a trailing edge with a third pattern formed thereon.

FIG. 5 shows different fluid dynamic body 1c having trailing edge 10 with third pattern 12c formed thereon. Pattern 12c comprises a plurality of adjacent members 14c with respective interstices 16c therebetween. The plurality of adjacent members 14c are sharply pointed like triangles with respective apices 24c aligned on trailing edge 10. In this case, the plurality of adjacent members 14c do not abut each other, but are spaced apart from each other, so that interstices 16c therebetween each commence with face 26c facing trailing edge 10 of fluid dynamic body 1c, face 26c separating one such member 14c from another. Faces 26c provide locations where vortices can be shed from fluid dynamic body 1c by fluid flowing parallel to faces 26c between upper surface 101c and lower surface 102c of fluid dynamic body 1c in the directions indicated in FIG. 5 by a double-headed arrow labelled F, thereby generating noise.

Figure 6:
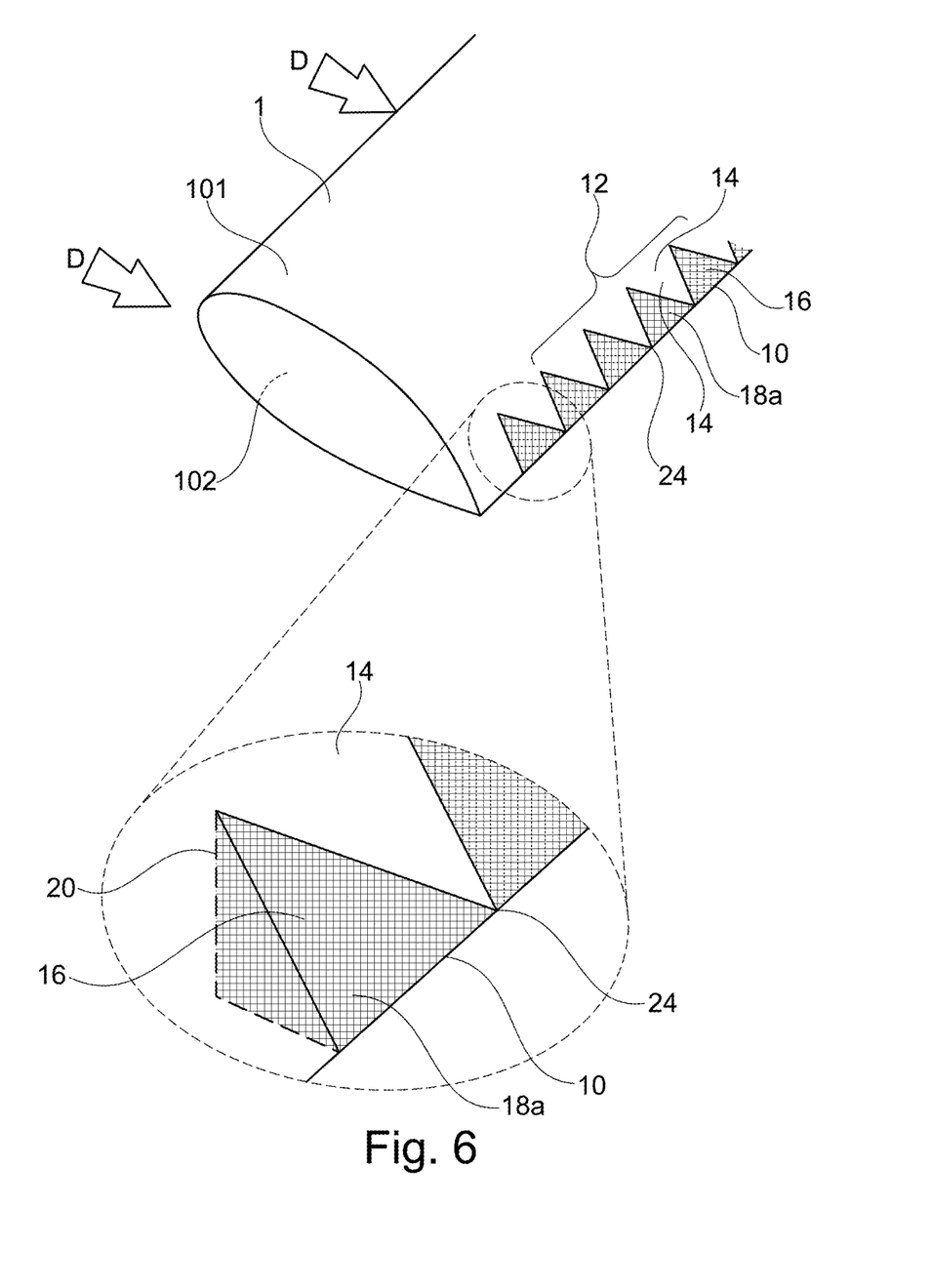
FIG. 6 shows a first embodiment of a fluid dynamic body.

FIG. 6 shows a first embodiment, wherein fluid dynamic body 1 has trailing edge 10 with pattern 12 formed thereon. Pattern 12 comprises a plurality of adjacent members 14 with respective interstices 16 therebetween. The plurality of adjacent members 14 are sharply pointed like triangles with respective apices 24 aligned on the trailing edge 10. The plurality of adjacent members 14 also abut each other at their respective roots, so that interstices 16 therebetween each commence in line 20 where the root of one such member 14 abuts another. Thus far, this embodiment is similar to fluid dynamic body 1a shown in FIG. 3. It differs from FIG. 3, in at least the fact that each interstice 16 contains porous barrier 18a, which obstructs fluid flow through respective interstice 16 between first surface 101 of fluid dynamic body 1 on a first side of trailing edge 10 and second surface 102 of fluid dynamic body 1 on a second side of trailing edge 10. On the other hand, since barrier 18a is porous, fluid is still able to flow in a major direction indicated in FIG. 6 by arrow D over the opposing surfaces 101, 102 of fluid dynamic body 1 and off trailing edge 10 thereof through interstices 16 between adjacent members 14 of pattern 12, thereby not inhibiting the beneficial noise reducing effects provided by pattern 12 in the first place.

In this case, porous barrier 18a comprises a foam. More specifically, in this case, it is made of foamed metal, although it could instead be, among other things, a set polymer foam. Either can obstruct fluid from flowing in the directions previously indicated in FIG. 3 by the double-headed arrow labelled E, thereby reducing noise. On the other hand, since barrier 18a is also porous, it can still allow fluid to flow through the interstices 16 in the major direction D.

Figure 7:
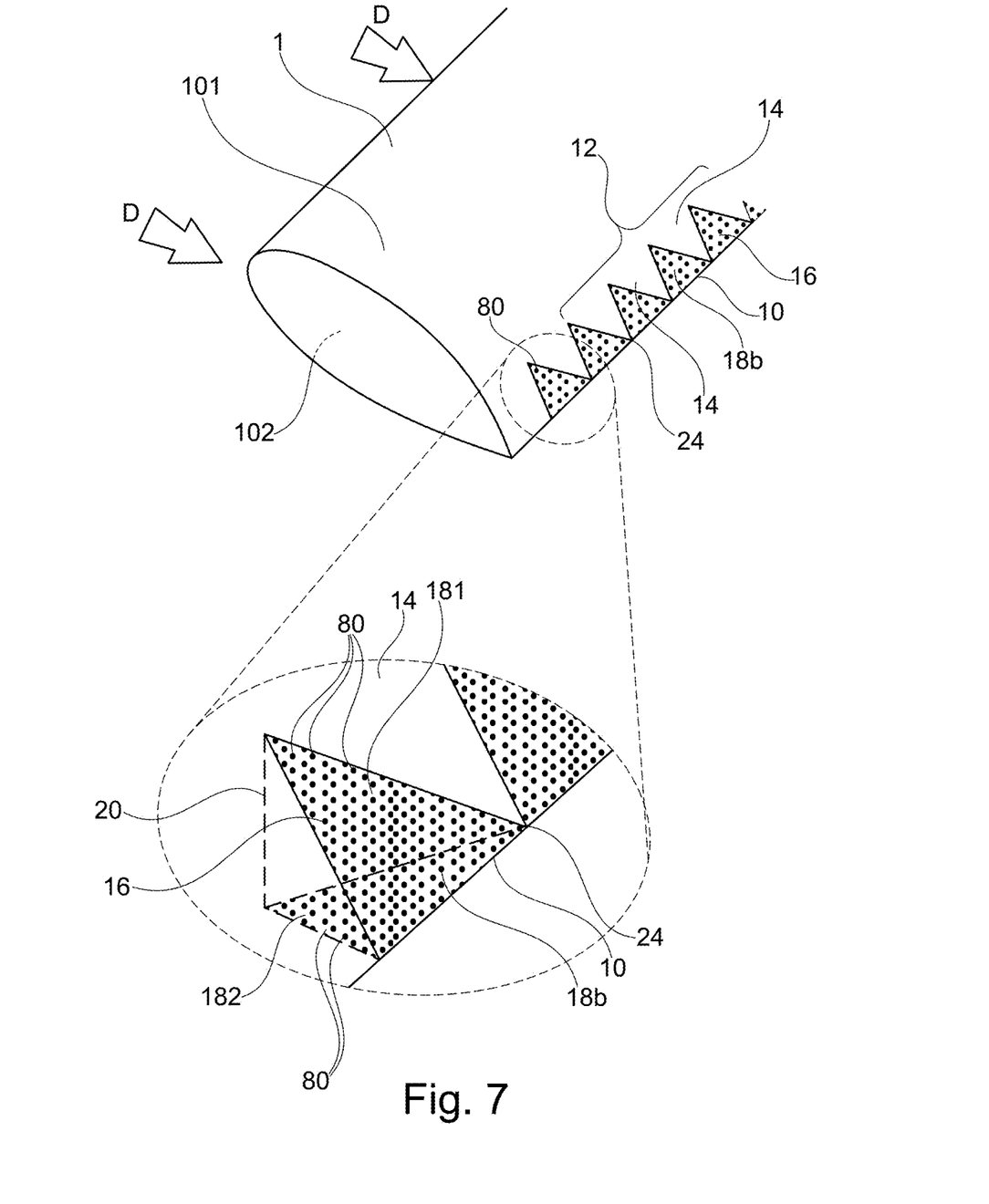
FIG. 7 shows a second embodiment of a fluid dynamic body.

FIG. 7 shows an alternative, second embodiment of fluid dynamic body 1. Fluid dynamic body 1 again has a basic geometry similar to that of FIG. 3, but wherein interstices 16 each contain porous barrier 18b comprising a plurality of perforations 80. In the embodiment shown in FIG. 7, barrier 18b is formed of upper plate 181 which follows the contour of upper surface 101 and lower plate 182 which follows the contour of lower surface 102. Both of plates 181, 182 are provided with perforations 80 and the rest of interstice 16 between plates 181, 182 is a void. However, barrier 18b could instead be formed from a solid block integral with fluid dynamic body 1, in which perforations passing all the way through from upper surface 101 to lower surface 102 could be formed by a micro-drilling process. Barrier 18b has the same beneficial noise reducing effects noted above as for barrier 18a, for the same reasons.

Figure 8:
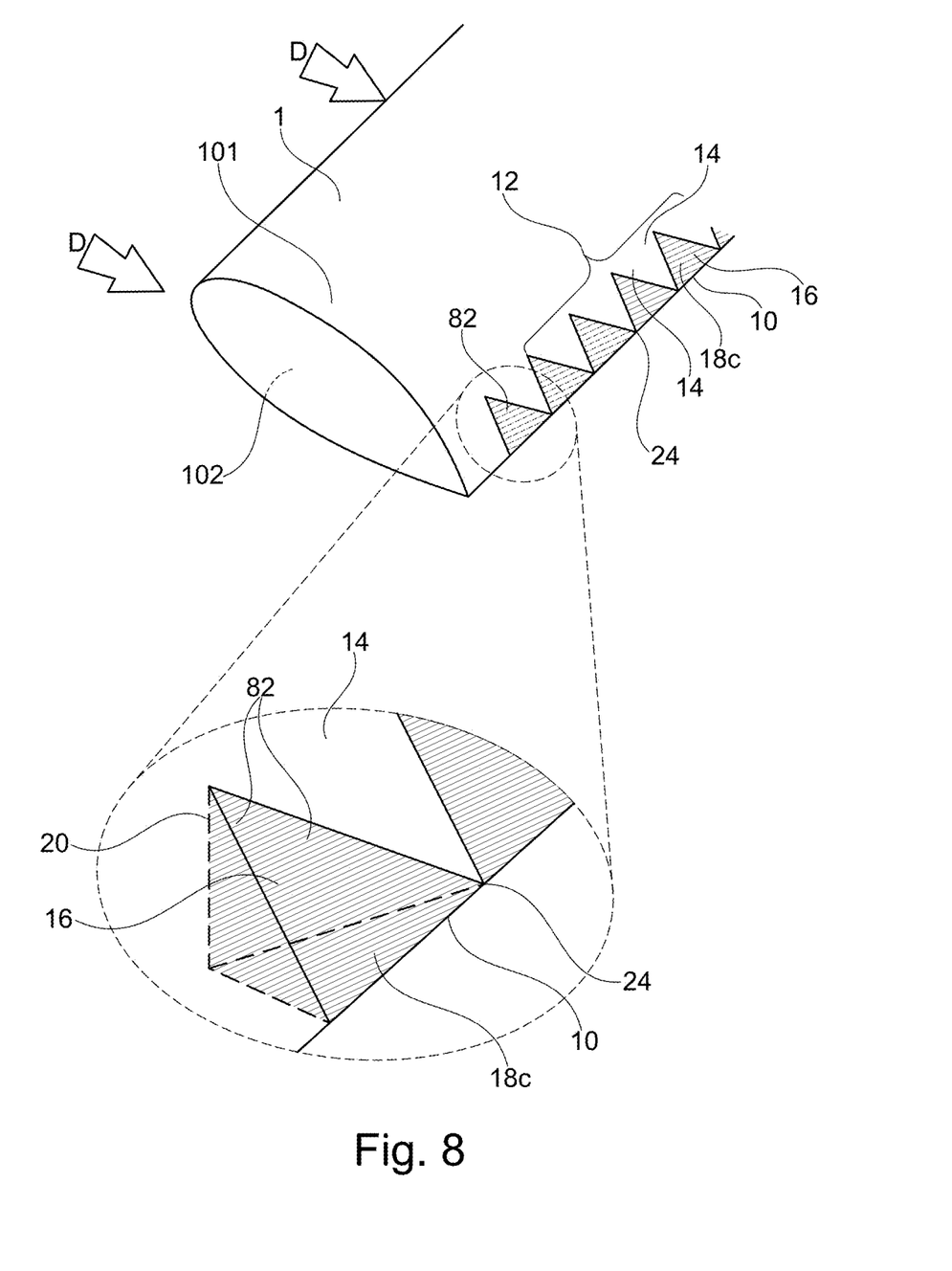
FIG. 8 shows a third embodiment of a fluid dynamic body.

FIG. 8 shows another alternative, third embodiment of fluid dynamic body 1 having a basic geometry similar to that of FIG. 3, but wherein interstices 16 each contain porous barrier 18c comprising a plurality of bristles 82, in the manner of a brush. In this embodiment, bristles 82 are mounted in interstice 16 in a direction substantially parallel to the major direction of fluid flow over the opposing surfaces 101, 102 of fluid dynamic body 1 indicated in FIG. 8 by arrow D. This encourages laminar fluid flow between the plurality of adjacent members 14 in the direction of arrow D and off trailing edge 10 of fluid dynamic body 1, while inhibiting the flow of fluid in the directions previously indicated in FIG. 3 by double-headed arrow E, thereby reducing noise.

Figure 9:
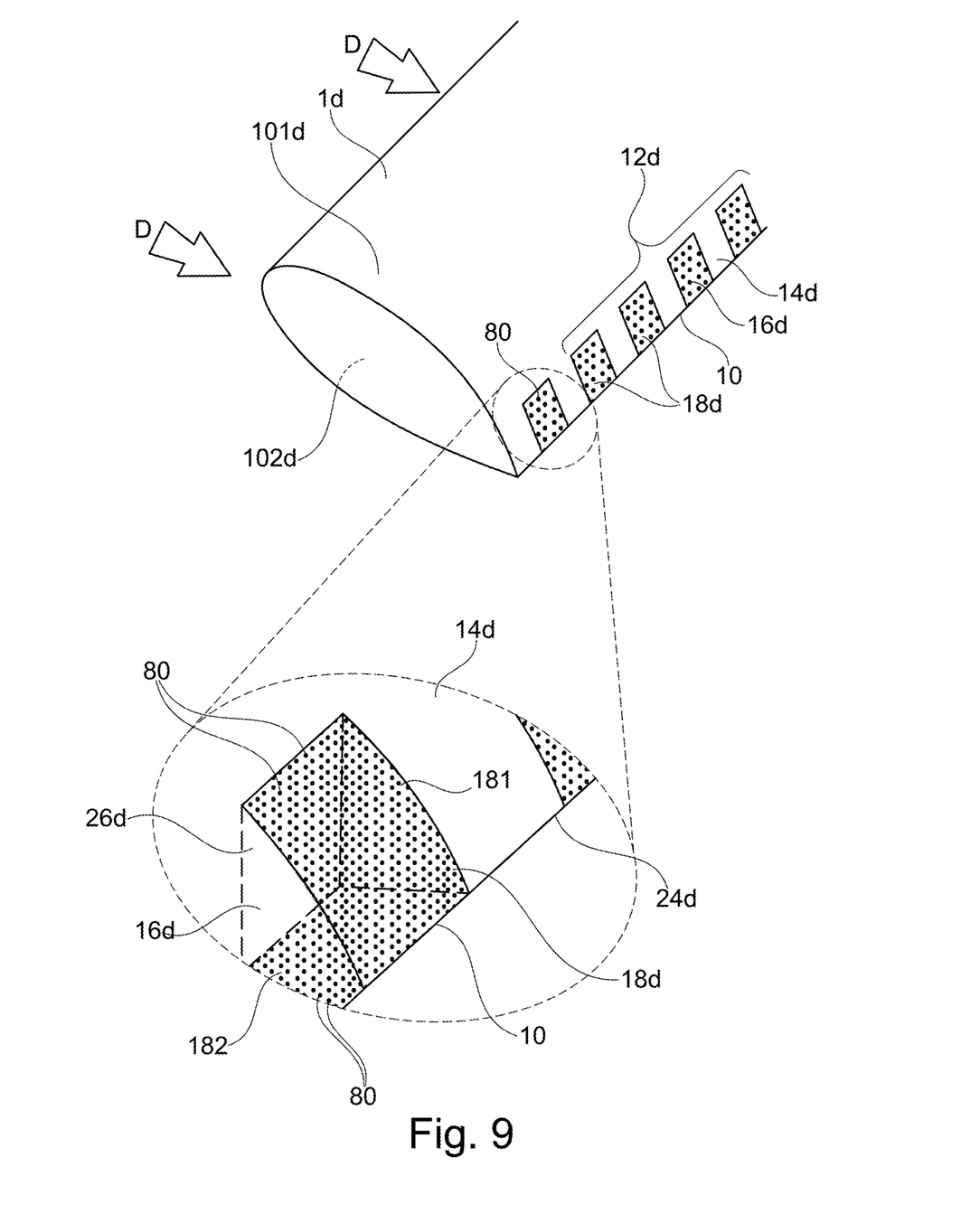
FIG. 9 shows a fourth embodiment of a fluid dynamic body.

Whereas FIGS. 6, 7 and 8 show embodiments wherein different types of porous barrier 18a, 18b, 18c have been applied to a fluid dynamic body with pattern 12 formed thereon similar to that of FIG. 3, the different types of porous barrier 18a, 18b, 18c could equally well be applied instead to a fluid dynamic body with pattern 12 formed thereon similar to that of FIG. 4 or FIG. 5 or to a fluid dynamic body having another different pattern formed thereon. For example, FIG. 9 shows an alternative, fourth embodiment, wherein fluid dynamic body 1d has trailing edge 10 with pattern 12d formed thereon. Pattern 12d comprises a plurality of adjacent members 14d shaped like tabs or rectangles with respective edges 24d coincident with trailing edge 10 and respective interstices 16d therebetween. The plurality of adjacent members 14d are also spaced apart from each other, so that interstices 16d therebetween each commence with face 26d facing trailing edge 10 of fluid dynamic body 1d, face 26d separating one such member 14d from another. Faces 26d provide locations where vortices could otherwise be shed from the fluid dynamic body 1d by fluid flowing parallel to faces 26d between upper surface 101d and lower surface 102d of fluid dynamic body 1d. However, in order to obstruct such fluid flow, interstices 16d each contain porous barrier 18d comprising a plurality of perforations 80, thereby reducing noise. In the embodiment shown in FIG. 9, barrier 18d is formed of upper plate 181 which follows the contour of upper surface 101d and lower plate 182 which follows the contour of lower surface 102d. Both of plates 181, 182 are provided with perforations 80 and the rest of interstice 16d between plates 181, 182 is a void. However, barrier 18d could instead be formed from a solid block integral with fluid dynamic body 1d, in which perforations passing through from upper surface 101d to lower surface 102d could be formed by a micro-drilling process.

Moreover, whereas the different types of porous barrier 18a, 18b, 18c, 18d have been shown respectively comprising only a foam (and more specifically a foamed metal), only a plurality of perforations and only a plurality of bristles, yet another different type of porous barrier according to another embodiment and providing similarly beneficial noise reduction effects could also comprise combination of some or all of a foam, such as a foamed metal, a plurality of perforations and a plurality of bristles.

Moreover, in FIGS. 3, 4, 5 and 9, patterns 12a, 12b, 12c, 12d on trailing edge 10 are shown to be part of contour 104 of an airfoil or hydrofoil of the respective fluid dynamic bodies 1a, 1b, 1c, 1d and in FIGS. 6, 7, 8 and 9. Porous barriers 18a, 18b, 18c, 18d are also shown to be part of contour 104 of an airfoil or hydrofoil of the respective fluid dynamic body 1, 1d. However, the pattern does not have to be continuous or integral with either one or both of the upper and lower surfaces of the fluid dynamic body, but can instead have a cross-section which is only partially or, in some embodiments, not at all continuous with the upper and lower surfaces of the fluid dynamic body, and can also be a discrete component of the fluid dynamic body, which is bolted-on to it for example. Similarly, the porous barrier does not have to be continuous or integral with either one or both of the upper and lower surfaces of the fluid dynamic body, but can instead have a cross-section which is only partially or, in some embodiments, not at all continuous with the upper and lower surfaces of the fluid dynamic body, and can either be formed integrally with the fluid dynamic body during manufacture, or formed integrally with the pattern if the latter is a discrete component of the fluid dynamic body added to it later, or can itself be added to the pattern later in a retrofitting operation. In some preferred embodiments, the porous barrier can be part of a contour of an airfoil or hydrofoil of the fluid dynamic body, as this optimizes, or at least increases, the noise reducing effect of the porous barrier.

Furthermore, whereas in FIGS. 3 to 9, the pattern is shown to be periodic, similar principles can be applied to aperiodic patterns resulting in similar beneficial noise reduction effects by providing a plurality of porous barriers of different sizes and shapes adapted to the different sizes and shapes of the interstices of an aperiodic pattern. Moreover, whereas the porous barriers 18a, 18b, 18c, 18d in FIGS. 6, 7, 8 and 9 are shown to occupy the respective interstices of the pattern therein completely, in other alternative embodiments, the porous barrier can only partially occupy one or more of the respective interstices of the pattern to have the desired noise reducing effect, provided that the porous barrier obstructs fluid flowing through the respective interstice between a first surface of the fluid dynamic body on a first side of the trailing edge and a second surface of the fluid dynamic body on a second side of the trailing edge. However, since the noise reducing effect increases as the interstice becomes progressively more filled by the porous barrier, in some preferred embodiments, the porous barrier should occupy at least 20%, preferably 40%, more preferably 60%, more preferably still 80%, and most preferably 100% (all) of the volume of the respective interstice. If the porous barrier does occupy all of the volume of the respective interstice, it has the added advantages of making the fluid dynamic body more structurally stable, safer to use and more able to retain an airfoil or hydrofoil shape when fluid flows in a major direction over the opposing surfaces of the fluid dynamic body and off the trailing edge thereof.

In some preferred embodiments, the porous barrier should fully occupy a width of the respective interstice, even if it does not occupy the full volume of the interstice. By the "width" of the interstice is meant a dimension of the interstice substantially parallel to the trailing edge. A porous barrier which occupies the full width of the interstice is effective in obstructing fluid flow between the first surface of the fluid dynamic body on a first side of the trailing edge and the second surface of the fluid dynamic body on a second side of the trailing edge. For example, therefore, the porous barrier could comprise a single row of bristles occupying the full width of the respective interstice, which would have the desired noise reducing effect, while only occupying less than 10% of the whole volume of the respective interstice.

Figure 10:
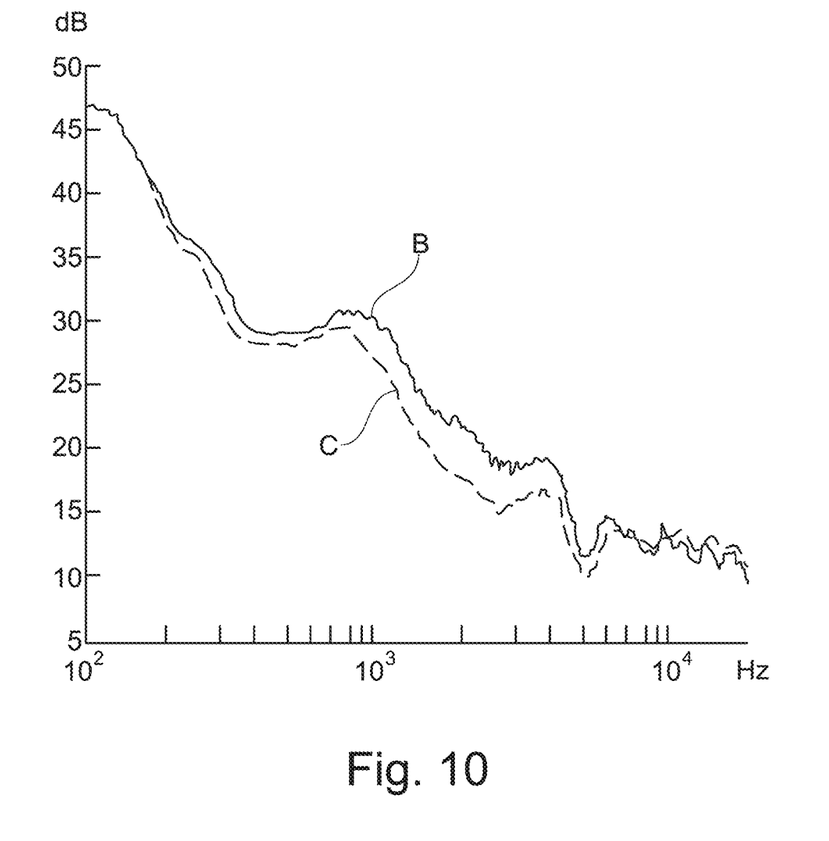
FIG. 10 is a graph showing the noise reduction achieved with the first embodiment shown in FIG. 6.

FIG. 10 is a graph showing the noise reduction effect achieved with a first embodiment shown in FIG. 6. FIG. 10 is a log-linear plot of sound power level measured in decibels for a free fluid flow velocity of 40 ms$^{-1}$ over a fluid dynamic body. This sound power level is represented on a linear scale on the ordinate (y-axis) of FIG. 10, plotted against frequency measured in hertz and represented on a logarithmic scale on the abscissa (x-axis) of FIG. 10. The solid line labelled B shows the sound power level measured for fluid dynamic body 1 with sharp trailing edge 10 as shown in FIGS. 1 and 2, without a pattern formed thereon and without porous barriers, while the dotted line labelled C shows the sound power level measured for a similarly shaped fluid dynamic body, but with pattern 12 and with porous barriers 18a formed thereon, as shown in FIG. 6. As shown, the porous barriers achieve a broadband noise reduction of up to 7 dB relative to the sharp trailing edge, across a frequency range from around 200 Hz up to around 5 kHz, with only a negligible increase in high frequency noise above that level, where the dotted line labelled C firstly crosses and then rises only very slightly above the solid line labelled B Similar measurements of the same embodiment at free fluid flow velocities of from 20 to 60 ms$^{-1}$ are found to give the same levels of noise reduction. Other embodiments also achieve the same type of broadband noise reduction with only a negligible increase in high frequency noise as that shown in FIG. 10.

Figure 11:
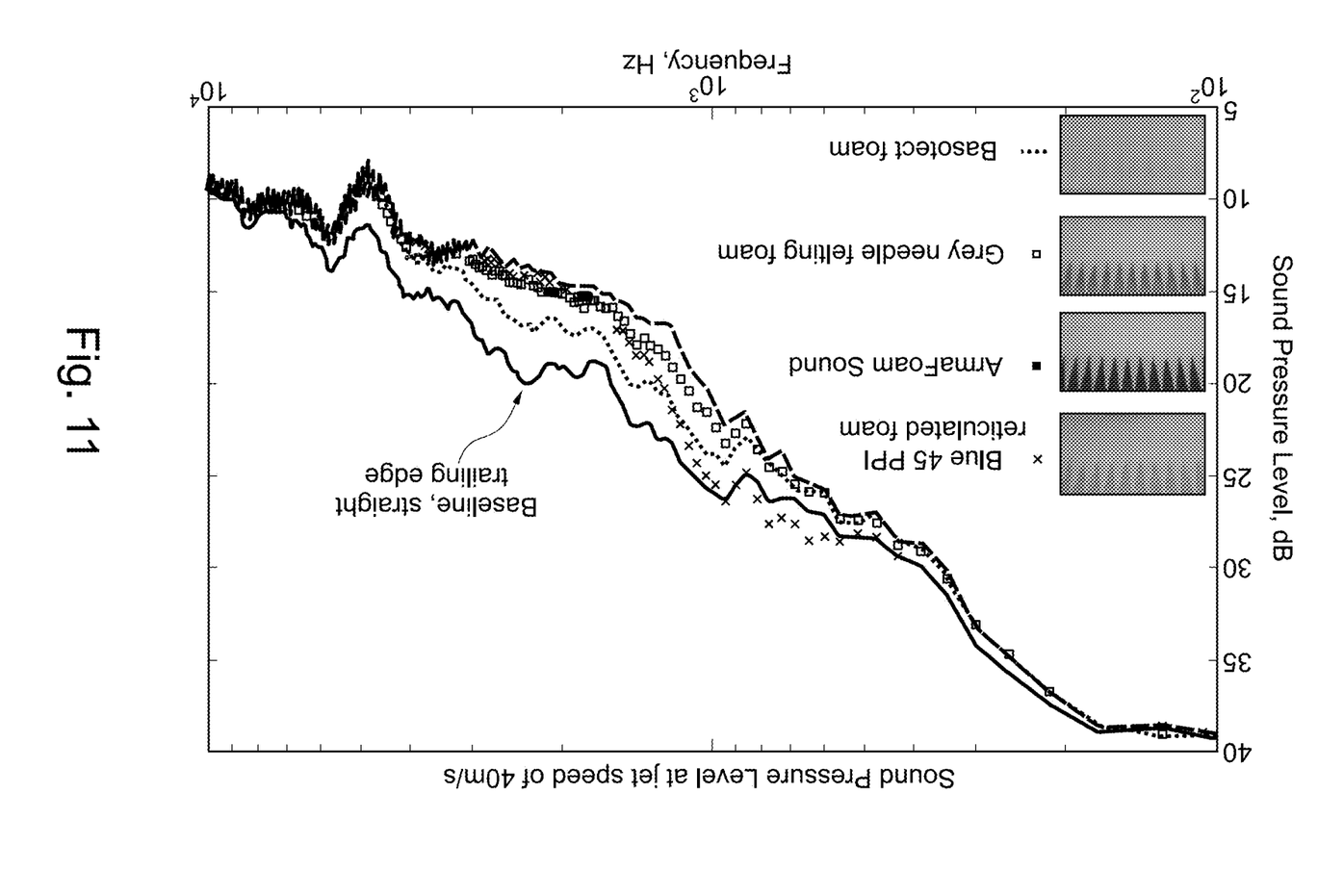
FIG. 11 is a graph showing the effect of the flow resistivity of various porous materials on noise reduction.

FIG. 11 shows the results of an experiment to measure the effect of the flow resistivity of various porous materials on noise reduction. The airfoil under investigation was an airfoil with a sawtooth serration cut directly into the main body of the airfoil. The chord length (C) of the airfoil was 150 mm, and the width is 450 mm. Between the leading edge x/C=0, and x/C=0.79, the original airfoil profile was unmodified, where x is the streamwise direction. Further downstream, 0.79<x/C<1.0, is a section that can be removed and replaced by a serration profile. Once attached the serrations form a continuous profile giving the appearance that the serrations are cut into the main body of the airfoil. The porous materials of different flow resistivities were cut to match the shape of the interstices, so that the airfoil would have a continuous profile throughout the chord length. Free field measurements of the airfoil self noise were conducted in an aeroacoustic wind tunnel situated inside a 4 m×5 m×3.4 m anechoic chamber. The nozzle exit of the open jet wind tunnel was rectangular with dimensions of 0.10 m (height)×0.30 m (width). The airfoil was held by side plates and attached flushed to the nozzle lips. Far field noise measurements were made by a single condenser microphone at polar angles of Q=90° at a distance of 1.0 m from the airfoil trailing edge at mid span. Noise data was acquired at a sampling frequency of 44 kHz for 10 seconds by a 16-bit Analogue-Digital card from National Instrument. The data was then windowed and the Power Spectral Density (PSD) of 1 Hz bandwidth computed from a 1024 point FFT.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A fluid dynamic body comprising a trailing edge with a pattern formed thereon, said pattern comprising a plurality of smoothly surfaced adjacent members with respective interstices therebetween,
   wherein at least one of said interstices forms opposing surfaces extending to an open end aligned with said trailing edge,
   wherein a barrier comprises complementary surfaces in contact with the opposing surfaces defining a filled entire volume with an upper contour surface and a lower contour surface that extend to said trailing edge,
   wherein said barrier obstructs fluid flow through said respective interstice between said upper contour surface and said lower contour surface,
   wherein said barrier comprises a plurality of pores,
   and wherein said pores are completely surrounded by said barrier.

2. The fluid dynamic body of claim 1 wherein said barrier has a solidity ratio of from 4% to 96%.

3. The fluid dynamic body of claim 1 wherein said barrier comprises a foam.

4. The fluid dynamic body of claim 1 wherein said barrier is made of foamed metal.

5. The fluid dynamic body of claim 1 wherein said barrier comprises a plurality of perforations.

6. The fluid dynamic body of claim 1 wherein said pattern on said trailing edge is part of a contour of an airfoil or hydrofoil of said fluid dynamic body.

7. The fluid dynamic body of claim 1 wherein said barrier is part of a contour of an airfoil or hydrofoil of said fluid dynamic body.

8. The fluid dynamic body of claim 1 wherein said pattern is periodic.

9. The fluid dynamic body of claim 8 wherein said pattern comprises a serration.

10. The fluid dynamic body of claim 1 wherein said fluid dynamic body is a wind turbine blade or an air-engine blade.

11. The fluid dynamic body of claim 1 wherein said barrier has a flow resistivity of from $10^2$ Pa·s/m² to $10^5$ Pa·s/m².

12. The fluid dynamic body of claim 1 wherein said barrier is formed of woolen felt, synthetic foam, synthetic felt, elastomer foam, porous glass granulate, melamine resin-foam, metal-foam, PUR-foam or PU-foam.

13. The fluid dynamic body of claim 1 wherein, said barrier is formed of a material having a flow resistivity of 700, 1000, 1500, 3600, 4000, 4400, 8200, 9800, 16500, 23100, 40100, 112100, 130200, 164800, 316500, or 506400 Pa·s/m².

14. A method of manufacturing a fluid dynamic body, said method comprising:
 a) forming a pattern on a trailing edge of said fluid dynamic body,
 wherein said pattern comprises a plurality of smoothly surfaced adjacent members with respective interstices therebetween,
 wherein at least one of said interstices forms opposing surfaces extending to an open end aligned with said trailing edge;
 b) providing said at least one of said interstices with a barrier comprising complementary surfaces in contact with said opposing surfaces defining a filled entire volume with an upper contour surface and a lower contour surface that extend to said trailing edge,
 wherein said barrier obstructs fluid flow through said respective interstice between said upper contour surface and said lower contour surface,
 wherein said barrier comprises a plurality of pores, and
 wherein said pores are completely surrounded by said barrier.

15. The method of claim 14, wherein said pattern is formed integrally with a contour of an airfoil or hydrofoil of said fluid dynamic body.

16. The method of claim 14, wherein providing at least one of said interstices with a barrier comprises forming said barrier integrally with a contour of an airfoil or hydrofoil of the fluid dynamic body.

17. The method of claim 14, wherein forming said pattern on the trailing edge and providing at least one of said interstices with a barrier are performed simultaneously, and wherein providing at least one of said interstices with a barrier comprises forming said barrier integrally with said plurality of smoothly surfaced adjacent members.

18. The method of claim 14, wherein providing at least one of said interstices with a barrier comprises micro-drilling said barrier with perforations.

* * * * *